US011970281B2

(12) United States Patent
Misfeldt

(10) Patent No.: US 11,970,281 B2
(45) Date of Patent: *Apr. 30, 2024

(54) INTEGRATED FEEDBACK TO FLIGHT COMPUTER FOR ADJUSTING POWER DISTRIBUTION TO ROTORCRAFT MOTORS

(71) Applicant: Ansel Misfeldt, Cupertino, CA (US)

(72) Inventor: Ansel Misfeldt, Cupertino, CA (US)

(73) Assignee: Ansel Misfeldt, Cupertino, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/929,025

(22) Filed: Jul. 14, 2020

(65) Prior Publication Data

US 2021/0107668 A1 Apr. 15, 2021

Related U.S. Application Data

(63) Continuation of application No. 15/700,172, filed on Sep. 10, 2017, now Pat. No. 10,737,798.

(Continued)

(51) Int. Cl.
*B64D 31/10* (2006.01)
*B64C 27/08* (2023.01)
(Continued)

(52) U.S. Cl.
CPC .............. *B64D 31/10* (2013.01); *B64C 27/08* (2013.01); *B64C 39/024* (2013.01); *B64D 27/24* (2013.01);
(Continued)

(58) Field of Classification Search
CPC ........ B64D 27/24; B64D 31/06; B64D 31/08; B64D 31/10; B64C 27/08; B64C 39/024; B64C 2201/042; H02P 6/24; G05D 1/0072
See application file for complete search history.

(56) References Cited

U.S. PATENT DOCUMENTS 9,242,576 B1 * 1/2016 Turnbull ................. H02P 29/68
9,448,562 B1 * 9/2016 Sirang ................. G05D 1/0676
(Continued)

FOREIGN PATENT DOCUMENTS

CN 205633038 U * 10/2016 ............. B64C 37/00
JP 2014075867 A * 4/2014 ............... B64B 1/02
(Continued)

OTHER PUBLICATIONS

Speas, Rebecca Barnett, "The functional application of the propeller load curve for fixed pitch propellers", Masters Thesis, University of Tennessee, Knoxville, Dec. 2006, 50 pages (Year: 2006).*
(Continued)

*Primary Examiner* — David A Testardi
(74) *Attorney, Agent, or Firm* — Folio Law Group PLLC

(57) ABSTRACT

A method and system for providing corrective action to a rotorcraft experiencing motor failure is provided. Included in the method and system are embodiments that receive feedback from sensors directed at measuring a state of motors used to provide lift to the rotorcraft. The method and system also describe embodiments for determining that there is a malfunctioning motor, and furthermore, the appropriate corrective action for responding to the malfunctioning motor. In some embodiments, the method and system are configured to reduce power to the malfunctioning motor while simultaneously adjusting power supplied to the remaining motors such that changes in total thrust and net torque are minimized. Further, the method and system are configured to perform diagnostics on the malfunctioning motor while power is still being supplied to the first motor.

20 Claims, 9 Drawing Sheets

Related U.S. Application Data

(60) Provisional application No. 62/393,454, filed on Sep. 12, 2016.

(51) Int. Cl.
    *B64C 39/02*         (2023.01)
    *B64D 27/24*         (2006.01)
    *B64D 31/06*         (2006.01)
    *G05D 1/00*          (2006.01)
    *B64D 45/04*         (2006.01)
    *B64U 10/10*         (2023.01)
    *B64U 10/13*         (2023.01)
    *B64U 50/19*         (2023.01)

(52) U.S. Cl.
    CPC .......... *B64D 31/06* (2013.01); *G05D 1/0072* (2013.01); *B64D 45/04* (2013.01); *B64U 10/10* (2023.01); *B64U 10/13* (2023.01); *B64U 50/19* (2023.01)

(56) References Cited

U.S. PATENT DOCUMENTS

| | | | |
|---|---|---|---|
| 9,828,095 B1* | 11/2017 | Wilcox | G05D 13/62 |
| 9,828,107 B1* | 11/2017 | Ruymgaart | B64D 31/00 |
| 10,737,798 B2* | 8/2020 | Misfeldt | B64C 27/08 |
| 11,065,979 B1* | 7/2021 | Demont | H01M 10/482 |
| 2006/0151666 A1* | 7/2006 | VanderMey | B64C 29/0016 244/12.3 |
| 2007/0153433 A1* | 7/2007 | Sundquist | H02P 29/64 361/25 |
| 2008/0144237 A1* | 6/2008 | Hirasawa | H02P 29/032 361/25 |
| 2009/0088294 A1* | 4/2009 | West | H02P 29/0241 701/99 |
| 2009/0288634 A1* | 11/2009 | Takizawa | H02P 29/60 123/349 |
| 2013/0013231 A1* | 1/2013 | Banerjee | B60L 3/0061 702/58 |
| 2013/0110325 A1* | 5/2013 | Sapp, II | G05D 1/0088 701/3 |
| 2014/0062348 A1* | 3/2014 | Isayeva | G05B 9/03 318/139 |
| 2014/0097290 A1* | 4/2014 | Leng | B64D 33/08 244/6 |
| 2014/0191695 A1* | 7/2014 | Ganev | H02H 5/04 318/471 |
| 2014/0277882 A1* | 9/2014 | Isayeva | B60L 3/003 903/903 |
| 2015/0263662 A1* | 9/2015 | Lee | B60L 50/51 318/473 |
| 2016/0039529 A1* | 2/2016 | Buchmueller | B64C 11/00 244/65 |
| 2016/0107751 A1* | 4/2016 | D'Andrea | B64C 27/32 701/4 |
| 2016/0159472 A1* | 6/2016 | Chan | B64C 27/54 244/39 |
| 2017/0158342 A1* | 6/2017 | Ishii | G05D 1/0072 |
| 2017/0160750 A1* | 6/2017 | Kimchi | G05D 1/101 |
| 2017/0222594 A1* | 8/2017 | Tao | H02P 29/032 |
| 2017/0282910 A1* | 10/2017 | Kim | B60W 20/50 |
| 2018/0044016 A1* | 2/2018 | Baek | B64C 27/08 |
| 2018/0134378 A1* | 5/2018 | Oberndorfer | B64C 39/024 |
| 2018/0170535 A1* | 6/2018 | Sato | B64C 27/08 |
| 2018/0305033 A1* | 10/2018 | Joubert | G05D 1/0072 |
| 2018/0354623 A1* | 12/2018 | Bhat | B64C 27/10 |
| 2019/0009893 A1* | 1/2019 | Toyama | B64C 39/024 |
| 2019/0073912 A1* | 3/2019 | Mellinger, III | G08G 5/045 |
| 2019/0217948 A1* | 7/2019 | Pounds | B64C 39/024 |
| 2019/0256191 A1* | 8/2019 | Suzuki | B64C 39/02 |
| 2019/0315465 A1* | 10/2019 | Liu | G05D 1/0011 |
| 2020/0103922 A1* | 4/2020 | Nonami | G05D 1/0072 |
| 2020/0172257 A1* | 6/2020 | Bhat | B64C 39/024 |
| 2020/0283134 A1* | 9/2020 | Mores | B64C 27/10 |

FOREIGN PATENT DOCUMENTS

| | | | | |
|---|---|---|---|---|
| JP | 2014227155 A | * | 12/2014 | ............ B64C 27/08 |
| JP | 2015117003 A | * | 6/2015 | ............ B64C 37/00 |
| JP | 2017100651 A | * | 6/2017 | ............ B64C 27/08 |
| WO | WO-2012035025 A2 | * | 3/2012 | ............ B64C 27/08 |
| WO | WO-2017154421 A1 | * | 9/2017 | ............... B64B 1/02 |

OTHER PUBLICATIONS

EPO machine translation of JP 2014-075867A (original JP document published Apr. 24, 2014) (Year: 2014).*

JPO machine translation of JP 2014-227155 (original JP document published Dec. 8, 2014) (Year: 2014).*

Saied, Majd et al., "Fault Diagnosis and Fault-Tolerant Control Strategy for Rotor Failure in an Octorotor", 2015 IEEE International Conference on Robotics and Automation (ICRA), Seattle, Washington, May 26-30, 2015, pp. 5266-5271 (Year: 2015).*

Priority Document JPA-2016-047529 from U.S. Appl. No. 16/118,915, filed Mar. 10, 2016 (Year: 2016).*

EPO machine translation of JP 2017-100651A (original JP document published Jun. 8, 2017) (Year: 2017).*

EPO machine translation of JP 2014-227155 A (original JP document published Dec. 8, 2014) (Year: 2014).*

Wikipedia article, "Aircraft principal axes", Old revision dated Sep. 9, 2016, 3 pages (Year: 2016).*

* cited by examiner

INTEGRATED FEEDBACK TO FLIGHT COMPUTER FOR ADJUSTING POWER DISTRIBUTION TO ROTORCRAFT MOTORS

RELATED APPLICATIONS

The present application is a continuation of U.S. application Ser. No. 15/700,172, entitled "INTEGRATED FEEDBACK TO FLIGH COMPUTER," filed on Sep. 10, 2017, which claims the benefit or priority of U.S. Provisional Application No. 62/393,454, entitled "INTEGRATED FEEDBACK TO FLIGHT COMPUTER FOR ADJUSTING POWER DISTRIBUTION TO ROTORCRAFT MOTORS," filed on Sep. 12, 2016, the entireties of which is hereby incorporated by reference.

FIELD OF THE DISCLOSURE

The present disclosure relates to controlling rotorcraft, and more particularly, to methods and systems for taking corrective action in response to motor and/or respective electronic speed controller (ESC) failure by using feedback information from a plurality of motors and respective ESCs.

BACKGROUND

Vertical Take-Off and Landing (VTOL) vehicles have been in existence for some time and are valued for their ability to initiate flight without needing a runway. In addition to their ability to take-off and land vertically, VTOLs and other rotorcraft (e.g. helicopters, drones, 'quadcopters') are often more maneuverable, versatile, and better suited for unmanned flight conditions. In more recent years, there has been an explosion of VTOLs for recreational and consumer applications in the form of radio-controlled (RC) 'drones' (also known as quadcopters). As drones become more sophisticated, powerful, and reliable, there is an opportunity to leverage advantages of drone technology to meet a wider array of applications, including commercial and personal transportation.

Drones geared towards transporting more critical cargo are faced with a different set of challenges and requirements than those used for recreation. The criticality and risk of motor failure while transporting critical cargo is of much greater consequence than it is for recreational applications. Most drones on the market do not have a mechanism for monitoring the health of its motors. As a result, there is little recourse for currently available drones to maintain desired flight characteristics and/or land safely if the drone experiences motor failure. For critical applications, such as those of transporting humans, sensitive materials, and heavy cargo, safety measures that include monitoring motor health and having onboard contingency mechanisms are of utmost importance.

It is in this context that embodiments of the invention arise.

SUMMARY

Embodiments of the present invention provide methods and systems for monitoring motor health for rotorcraft, and more particularly, for providing feedback data from sensors monitoring motor and/or motor controller health to be processed by an onboard flight computer. The methods and systems also define embodiments for the flight computer to respond to conditions of motor and/or motor controller underperformance, malfunction, and/or failure. It should be appreciated that the present invention can be implemented in numerous ways, such as a process, an apparatus, a system, a device, or a method on a computer readable medium. Several embodiments of the present invention are described below. It should be appreciated that the present disclosure can be implemented in numerous ways, such as a process, an apparatus, a system, a device or a method on a computer readable medium. Several inventive embodiments of the present disclosure are described below.

In one embodiment, a method includes receiving, at a flight computer, feedback from a plurality of sensors associated with the plurality of motors. The method includes determining, at the flight computer, that a first motor in the plurality of motors is malfunctioning. Further, the method includes selecting, at the flight computer based on the feedback, one or more second motors in the plurality of motors for redistributing power. The method also includes reducing a power supplied to the first motor and increasing a power supplied to the one or more second motors selected for redistributing power. Additionally, the method includes performing diagnostics on the first motor while power is still being supplied to the first motor.

In another embodiment, A non-transitory machine-readable medium storing a program executable by at least one processing unit of a device is provided. The program comprises sets of instructions for receiving, at a flight computer, feedback from a plurality of sensors associated with the plurality of motors. The program also includes instructions for determining, at the flight computer, that a first motor in the plurality of motors is malfunctioning. Additionally, the program includes instructions for selecting, at the flight computer based on the feedback, one or more second motors in the plurality of motors for redistributing power. Further, the program includes instructions for reducing a power supplied to the first motor and for increasing a power supplied to the one or more second motors selected for redistributing power. Moreover, the program includes instructions for performing diagnostics on the first motor while power is still being supplied to the first motor.

In a further embodiment, a rotorcraft system is provided. The rotorcraft includes a plurality of motors for producing thrust. The rotorcraft system also includes a plurality of sensors for measuring one or more states of each of the plurality of motors. The rotorcraft system additionally includes a flight computer comprising one or more processors and a non-transitory machine-readable medium storing instructions. The instructions cause the one or more processors to receive, at a flight computer, feedback from a plurality of sensors associated with the plurality of motors. The instructions also cause the one or more processors to determine, at the flight computer, that a first motor in the plurality of motors is malfunctioning and to select, at the flight computer based on the feedback, one or more second motors in the plurality of motors for redistributing power. The instructions further cause the one or more processors to reduce a power supplied to the first motor and to increase a power supplied to the one or more second motors selected for redistributing power. Moreover, the instructions cause the one or more processors to perform diagnostics on the first motor while power is still being supplied to the first motor.

It should be noted that as used herein, 'motor failure' is taken to denote motor and/or controller failure, while 'motor health' is taken to mean motor and/or controller health, and 'motor malfunction' is taken to mean motor and/or controller malfunction. Furthermore, as used herein, 'controller' is generally taken to mean motor controller or electronic speed controller used for controlling a motor. Further still, the term 'event' is meant to be construed herein as one or more of a motor and/or controller failure, malfunction, non-optimal performance, or a reading by one or more sensors of the same, whether or not the reading is accurate.

Other aspects of the invention will become apparent from the following detailed description, taken in conjunction with the accompanying drawings, illustrating by way of example the principles of the invention.

BRIEF DESCRIPTION OF THE DRAWINGS

The invention may be best understood by reference to the following description taken in conjunction with the accompanying drawings, in which.

DETAILED DESCRIPTION

Figure 1:
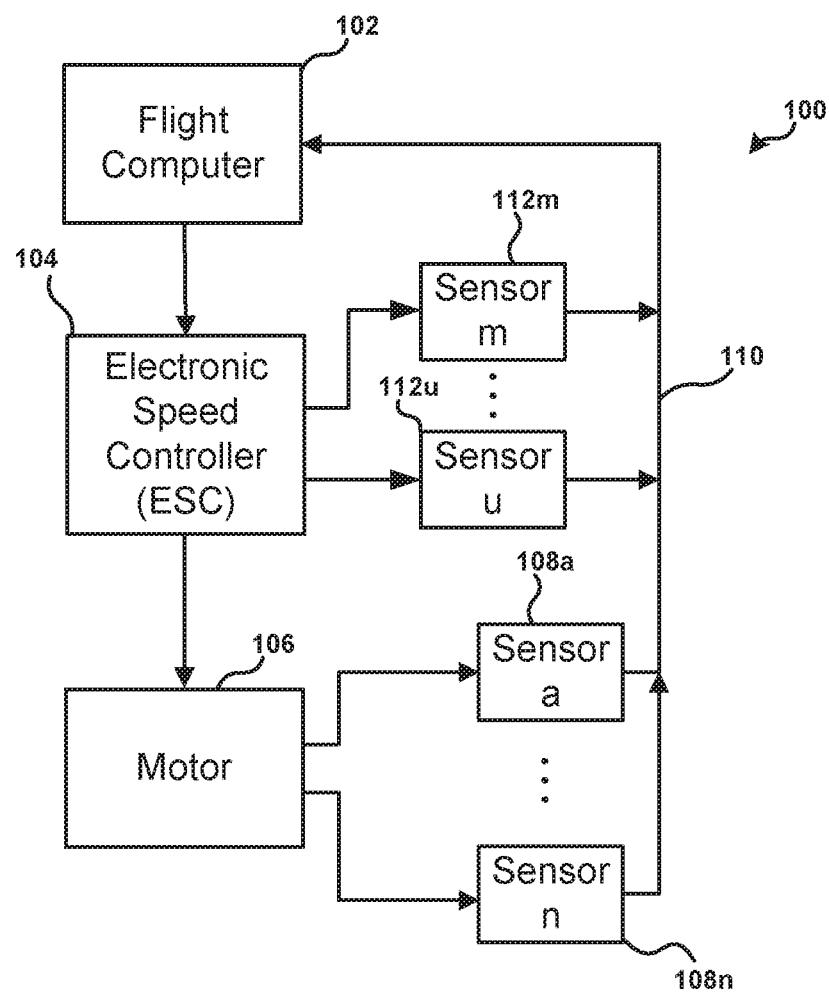
FIG. 1 shows an embodiment of a schematic of a feedback loop for assessing motor and/or controller health.

The following embodiments describe methods, computer programs, and apparatus for enabling a manned or unmanned vertical take-off and landing, or multirotor rotorcraft to take corrective action in response to motor failure to either maintain a current flight path, if possible, or prepare to reach the ground safely.

Drone-type flying machines (also referred here as rotorcraft) have seen a rise in popularity in recent years. Typically, drones available on the market for recreational purposes are propelled by four motor-rotor combinations and appropriately named 'quadcopters'. Quadcopters are classified as rotorcraft, as opposed to fixed-wing aircraft, because lift is generated by a set of vertically oriented propellers.

Quadcopters generally use two pairs of identical fixed pitched propellers, one pair of which are configured to spin clockwise and the other, counterclockwise. Control of the quadcopter is achieved through independent variation of rotor speed and/or pitch for each propeller. As a result of changing the speed of each rotor, it is possible to generate a total desired thrust, to locate a center of thrust, and to create a total torque, or turning force. Each of the motors is controlled by an electronic speed controller, which is an electronic circuit that is responsible for varying the speed of the motor. Controlling each ESC is an onboard computer, which is ultimately responsible for governing the flight characteristics of the quadcopter. The onboard flight computer is able to execute desired flight characteristics by dynamically adjusting the amount of power supplied to each motor.

Generally speaking, the flow of signal between flight computer to ESC to motor is one-way, especially in the case of recreational multirotor flying machines. There is little need to monitor motor health in recreational applications because the motors are generally under small load and the consequences of motor failure are not so great. In contrast, it is necessary that a rotorcraft or other drone-type flying machine made for critical applications to have a mechanism for detecting motor failure and to have a set of contingency mechanisms for when it does detect motor failure.

As used herein, the term "critical applications" is meant to denote applications of rotorcraft that are not "recreational." Generally speaking, critical applications may encompass applications of rotorcraft in which a corresponding payload is, for example, greater than 20 pounds.

One way of enabling a user or flight computer to monitor the health of each of the onboard motors is to dispose a plurality of sensors specific to measuring symptoms of motor failure (or ESC failure). For example, an above average temperature may indicate motor failure (or ESC failure), just as an overheating car engine might say the same of car's radiator, water pump, oil levels, etc. Other indications of motor failure may include irregular vibrations, power consumption, and rotor speed. These indications, once sensed by the plurality of sensors, are then fed back to the flight computer, for example, in real time.

Having the aforementioned feedback loop allows the flight computer to detect that a motor is not performing optimally. For example, if the flight computer detects that detected speed of the motor is lower or higher than what it is expected to be given the signal output to the ESC, it can then take appropriate corrective action. Corrective action may come in two or more forms, the first being to reduce power to the underperforming motor and continuing to monitor it for symptoms of motor failure. The other form of corrective action is to shut down the motor entirely. Depending upon the feedback received, the flight computer is configured to decide between the two forms of corrective action.

Once the flight computer has detected that a motor or ESC is underperforming or experiencing failure, it is configured to instruct the remaining motors to output compensating thrust in synchrony with the lowering of thrust of the failed motor. The initiation of compensatory thrust in synchrony with reduction of thrust in the faulty motor ensures that the flying machine does not experience a sudden loss in altitude or change in orientation due to shutting down the motor without synchronous compensatory thrust. The flight computer is also configured to take into account a net torque on the rotorcraft due to a reduction of power to one of the motors. By synchronizing the power down of a motor with the dynamic adjustment of power distribution to the remaining motors, the flight computer is able to minimize sudden changes in total thrust (changes in altitude), as well as net torque (changes in yaw). As a result the method and system is operable to act preemptively to motor malfunction as opposed to reactively.

Additionally, the flight computer is further configured to determine an appropriate flight plan depending on the state of the failed motor, the state of the remaining motors, the type of payload, and a degree of difficulty for reaching a destination. In some circumstance, the flight computer may decide to implement a flight plan similar to that of the one originally plan. In other conditions, the flight computer may decide to enter a "safe mode" flight plan, which may lower a flight velocity, lower a flying altitude, and fly along a flight path having a safer exit strategy. Furthermore, the flight computer may be configured to perform an "emergency landing," in which the flying machine directed to reach a ground or other body as quickly and safely as possible. Further yet, the flight computer may be configured to enter a manual mode in which a pilot, remote or onboard, can control the flying vehicle.

FIG. 1 shows an embodiment of a system 100 for monitoring a health of a motor. A flight computer (FC) 102 is shown to send signals to an electronic speed controller (ESC) 104. ESC 104 is shown to be connected to a motor 106. It should be noted that connections between FC 102 and ESC 104, and between ESC 104 and motor 106 are unidirectional. That is, signals are sent across said connections in a single forward direction. Sensors 108a-108n are shown to receive signals from motor 106, while sensors 112m-112u are shown to receive signals from ESC 104. As mentioned above, the sensors 108a-108n and 112m-112u may comprise of a temperature sensor, a Hall sensor, a piezoelectric sensor, a voltage sensor, a amperage sensor, a microelectromechanical system (MEMS) sensor, a vibrational sensor, among others. Each of sensors 108a-108n and 112m-112u send feedback to flight computer 102.

Figure 2:
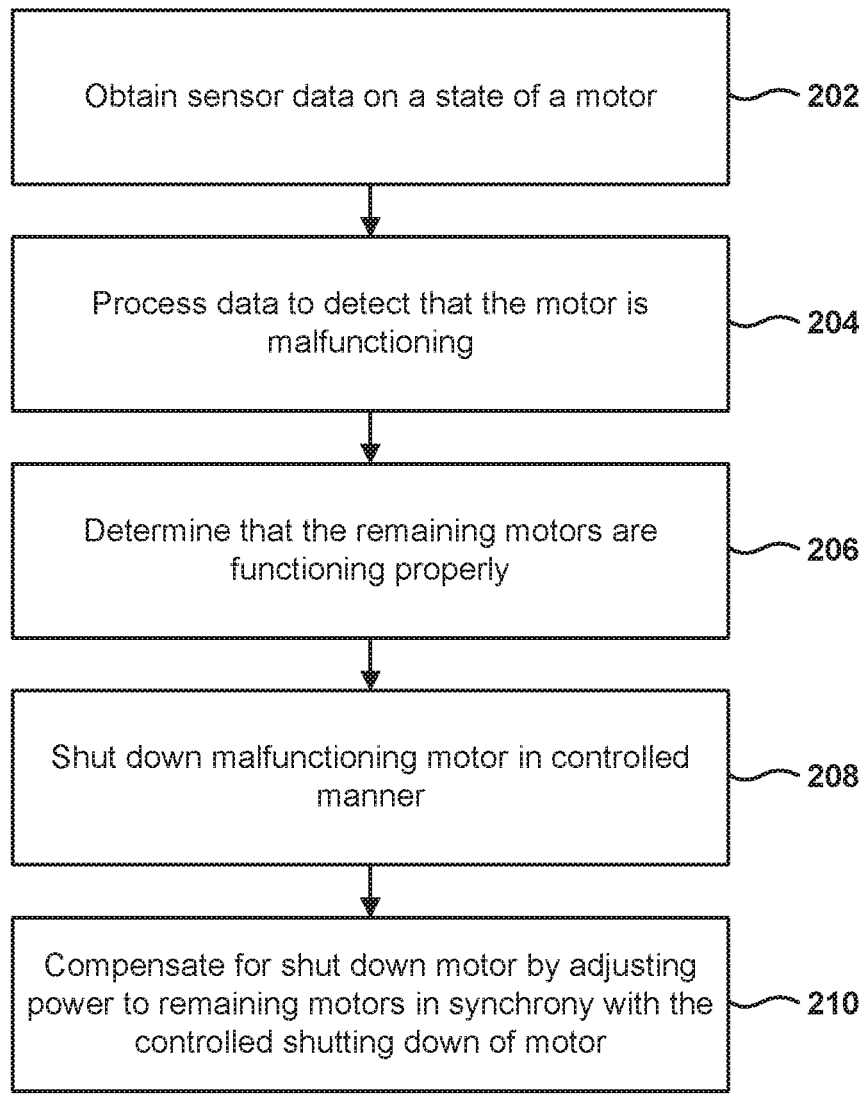
FIG. 2 shows an overall flow of a method for allowing a multirotor rotorcraft to detect and respond to motor failure and/or controller failure.

FIG. 2 shows an overall flow of a method for detecting and responding to motor malfunction. In operation 202, the method obtains sensor data on a state of a motor. The method then flows to operation 204, in which the flight computer, based on the sensor data obtained in operation 202, detects that a motor is malfunctioning. As a result of operation 204, the method may then determine that the remaining motors are functioning properly in operation 206. The method then flows to operation 208, which initiates a shutting down of the malfunctioning motor in a controlled fashion. In operation 210, the method compensates for the malfunctioning motor being shut down by increasing a power to the motors in synchrony with the decreasing of power to the malfunctioning motor. For example, the total thrust output during the shutting down of the malfunctioning motor may remain relatively the same.

Figure 3:
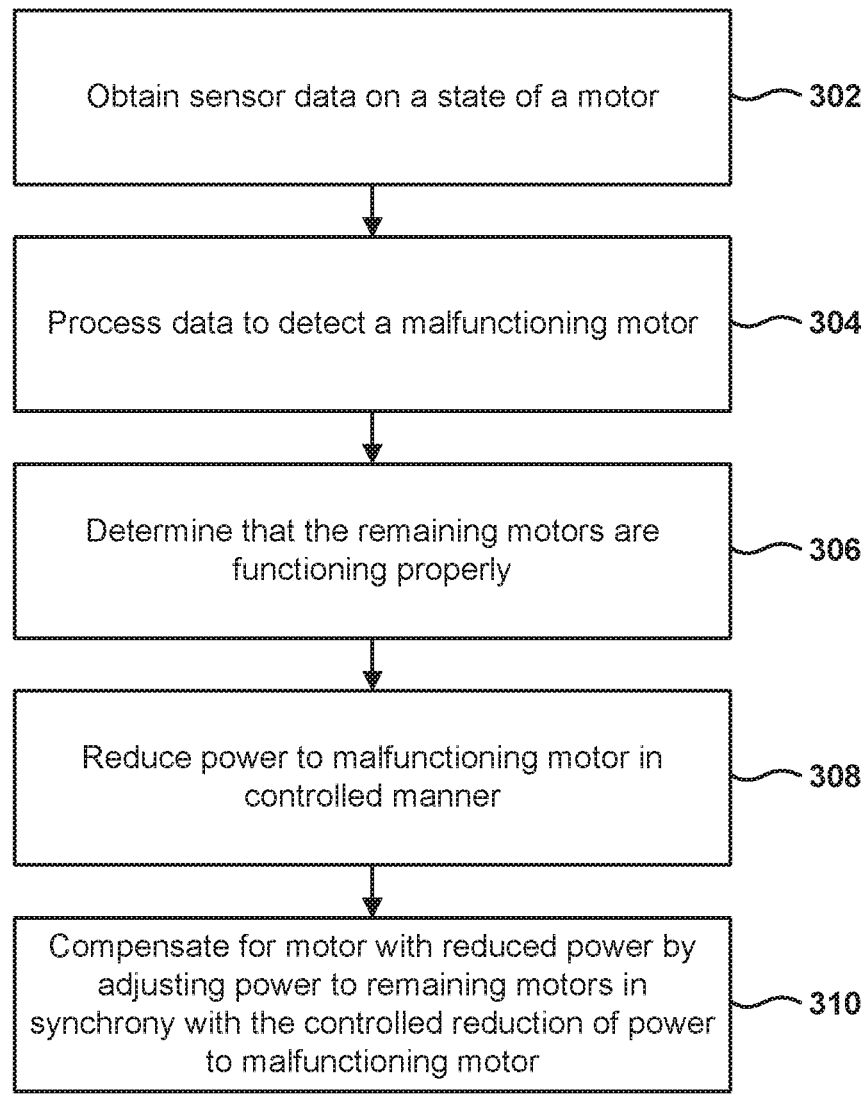
FIG. 3 shows an overall flow of an additional method for allowing a multirotor rotorcraft to detect and respond to motor failure and/or controller failure.

FIG. 3 shows an additional embodiment of a method for detecting and responding to a malfunctioning motor. Although operations 302-306 are much the same as the method depicted in FIG. 2, operation 308 serves to reduce power to the malfunctioning motor as opposed to shutting it down completely. In operation 310, the remaining motors are configured to compensate for the reduction in thrust provided by the malfunctioning motor in a controlled, synchronous manner such that changes in total thrust and/or altitude are minimal.

The method in as illustrated in FIG. 3 provides several distinct advantages to shutting down a malfunctioning motor completely. For example, by reducing power to said motor, the flight computer may be able to run diagnostics for the motor in situ. Implementing the same types of diagnostics is much more difficult if not impossible if there is no power supplied to the motor. Furthermore, the method as illustrated in FIG. 3 is better equipped to respond to false readings and/or self-correcting errors.

Figure 4:
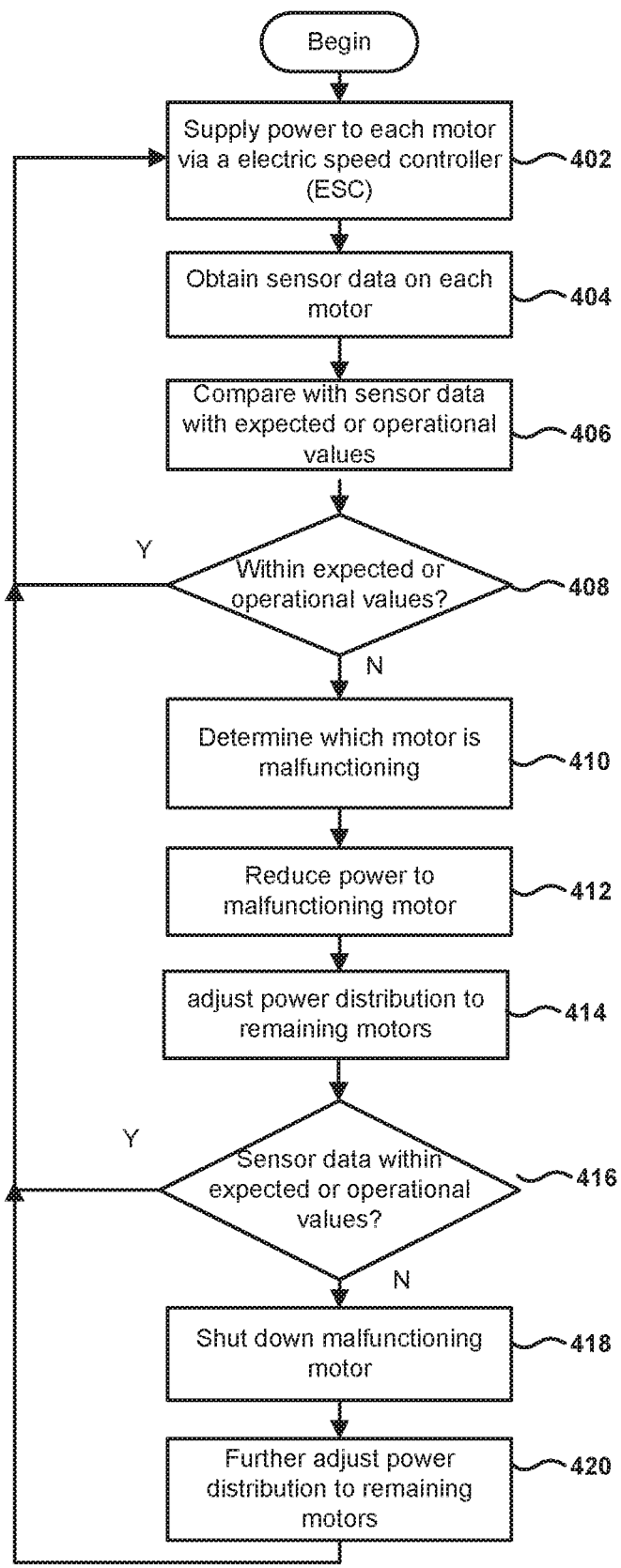
FIG. 4 shows a flow chart diagram of an embodiment of a method of implementing a response to motor and/or controller failure.

FIG. 4 show embodiments of a flow chart that may be implemented by a flight computer. First, the flight controller supplies power to a motor via a speed controller in step 402. In step 404, sensor data is obtained from sensors directed at measuring a health of the motor. The flight computer is operable to compare said sensor data with operational values and/or expected values at step 406. Operational values are those that are predetermined to be within a normal working range (e.g., factory standards). Expected values are an even narrower set of boundary conditions that specify, based on algorithms contained within a non-transitory computer readable medium for operating the flight computer, a value of a parameter that the motor is expected to exhibit. They may also take into account a number of other factors, such a historical data points for those values, environmental factors, and environmental factors. For example, the flight computer may detect that a motor (and its propeller) is spinning faster or slower than it is expected to based on a known power input. In this example, the propellers expected spinning rate (in RPM) is calculated based primarily on a power supplied to the motor. Conversely, if it is determined that a greater or lesser amount of power is necessary to maintain a certain propeller speed, operation 408 may then decide to flow to operation 410

Additionally, the flight computer may be configured to compare sensor data with not only operational and/or expected values, but also those of other motors. In typical flying conditions, for example, the temperature of each motor is expected to be relatively close to each of the others. If this is not the case, the flight controller, may determine in operation 408 that sensor data is not within expected and/or operational values (not shown).

After this determination is made, step 410 is operational to further determine which motor is malfunctioning. Again, this can be achieved by comparing individual motor sensor values with that of other motors, as well as expected and/or operational values. Steps 412 and 414 are configured to be initiated in synchrony. That is, while operation 410 reduces power to malfunctioning motor in a controlled manner, the flight computer simultaneously increases power to the remaining motors in operation 414. As a result of this synchronous compensatory thrust, the flying machine is able to remain stable throughout the process.

Also shown in FIG. 4 is operation 416, which decides whether updated sensor data are within expected and/or operational values after power has been reduced to the malfunctioning motor and increased to the remaining motors. If operation 416 determines that both the malfunctioning motor performing at a lower power is now operating within normal parameters as gathered by the motor's sensors, and that the same is true of the remaining motors operating at an increased power, the method flows back to operation 402.

If, on the other hand, operation 416 determines that the sensor data indicates that the malfunctioning motor is still not operating within expected and/or operational parameters, the method then flows to operation 418. In operation 418, the method shuts down malfunctioning motor entirely by no longer supplying it with power. Simultaneously, as the power is being shut down (or ramped down) for the malfunctioning motor, operation 420 increases (or ramps up) power to the remaining motors. Operations 418 and 420 are carried out in synchrony such that total thrust produced by the flying machine does not change suddenly.

Figure 5:
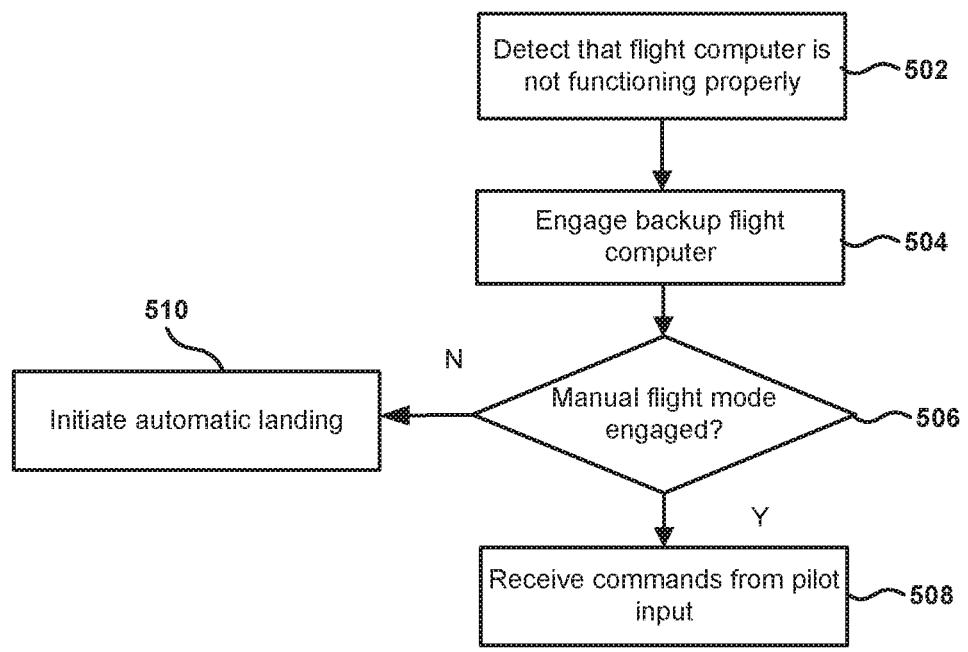
FIG. 5 shows an exemplary flow chart diagram of an embodiment of a method for implementing a response to flight computer failure.

FIG. 5 shows a flow chart of an embodiment for responding to a flight computer malfunction. In operation 502, a malfunction in the flight computer is detected. In response to operation 502, operation 504 serves to engage a backup flight computer. The method then flows to operation 506, which determines whether a manual flight mode has been engaged. If no such manual flight mode has been engaged, the method flows to operation 510, which initiates an automatic landing. If instead, operation 506 determines that a manual flight mode has been engaged, the method flows to operation 508, which receives commands for a pilot.

Figure 6:
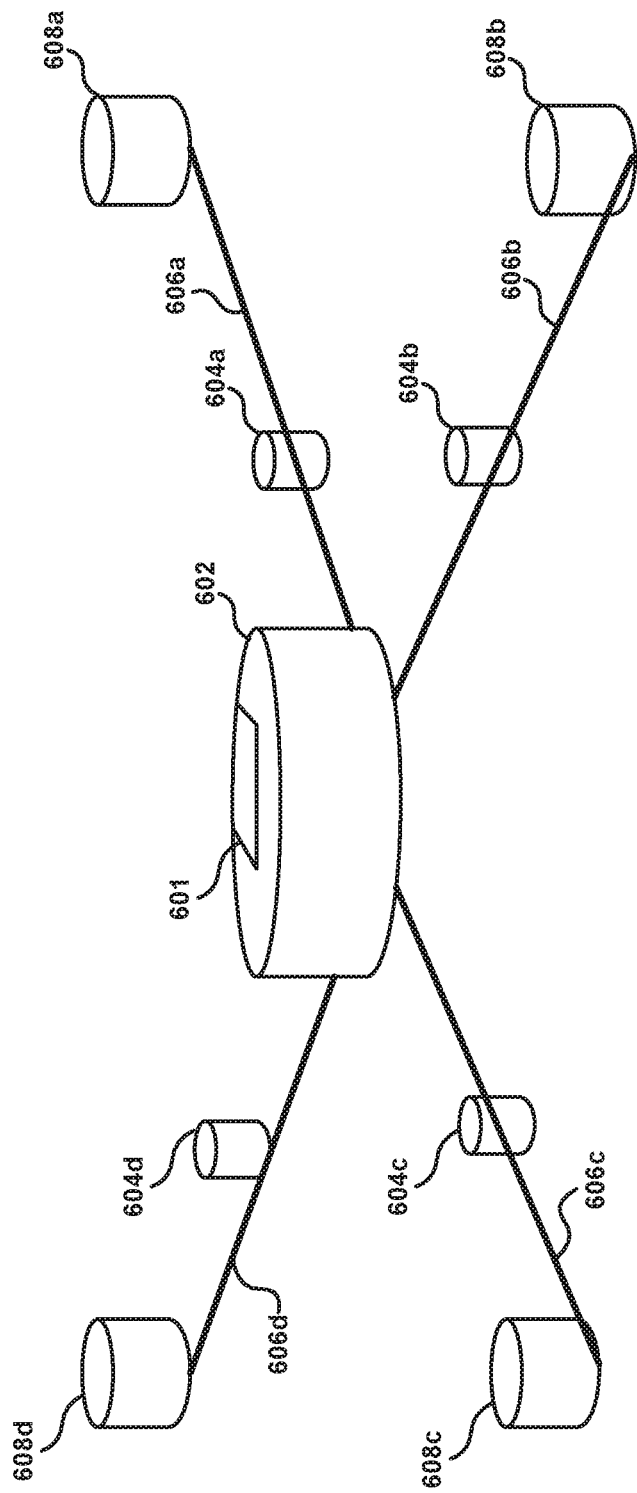
FIG. 6 shows a structural embodiment of a multirotor rotorcraft.

FIG. 6 shows a multirotor rotorcraft according to certain embodiments. Flight computer 601 is shown to be mounted on or in a body 602. Emanating from body 602 are support arms 606a-606d. Support arms 606a-606d provide structural support for ESCs 604a-604d and motors 608a-608d.

Figure 7:
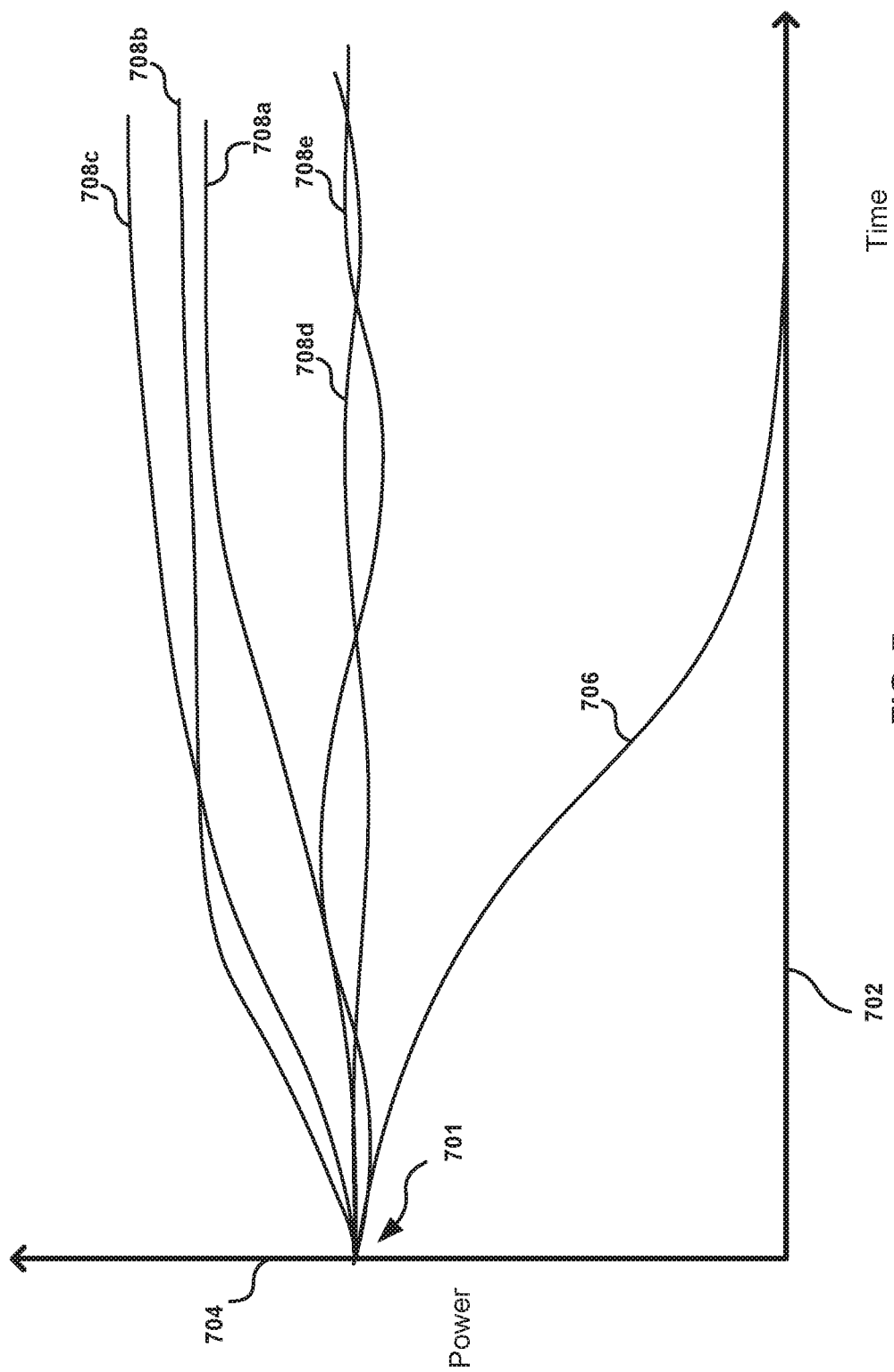
FIG. 7 shows an embodiment of power distribution to each of the motors of a multirotor rotorcraft once a motor is detected to be malfunctioning.

FIG. 7 shows a chart diagramming a distribution of power 704 supplied to motors 706, 708a-708e, over time 702, after detecting a malfunction 701 in motor 706, according to one embodiment. After a malfunction 701, power is gradually reduced to the malfunctioning motor 706 following a sigmoidal curve, although other methods of ramping down power to motor 706 are considered. While power is being reduced to motor 706, power supplied to remaining motors 708a-e is shown to adjust in step with the reduction of power to motor 706. In some embodiments, power to each remaining motor 708a-e may not necessarily be increased identically, nor increased at all. For example, motor 708d does not experience a large difference in supplied power, and motor 708e is shown to first experience a decrease in power followed by a slight ramping up of power. Thus, as shown in the figure, power supplied to the remaining motors 708a-e is shown to be non-identical and dynamic, increasing or decreasing, all depending on the needs of the particular flying machine, payload, and circumstance.

Although FIG. 7 is representative of power distribution to a plurality of motors after an event, it is also illustrative of power distribution supplied to the respective controllers. That is, whether there is an event specific to a either a motor or a controller, the dynamics of power distribution will still follow, qualitatively, the graph as illustrated. The same is true of FIGS. 8 and 9b, shown below, insofar as power distribution supplied to each controller following controller failure will be substantially similar to that following motor failure.

Figure 8:
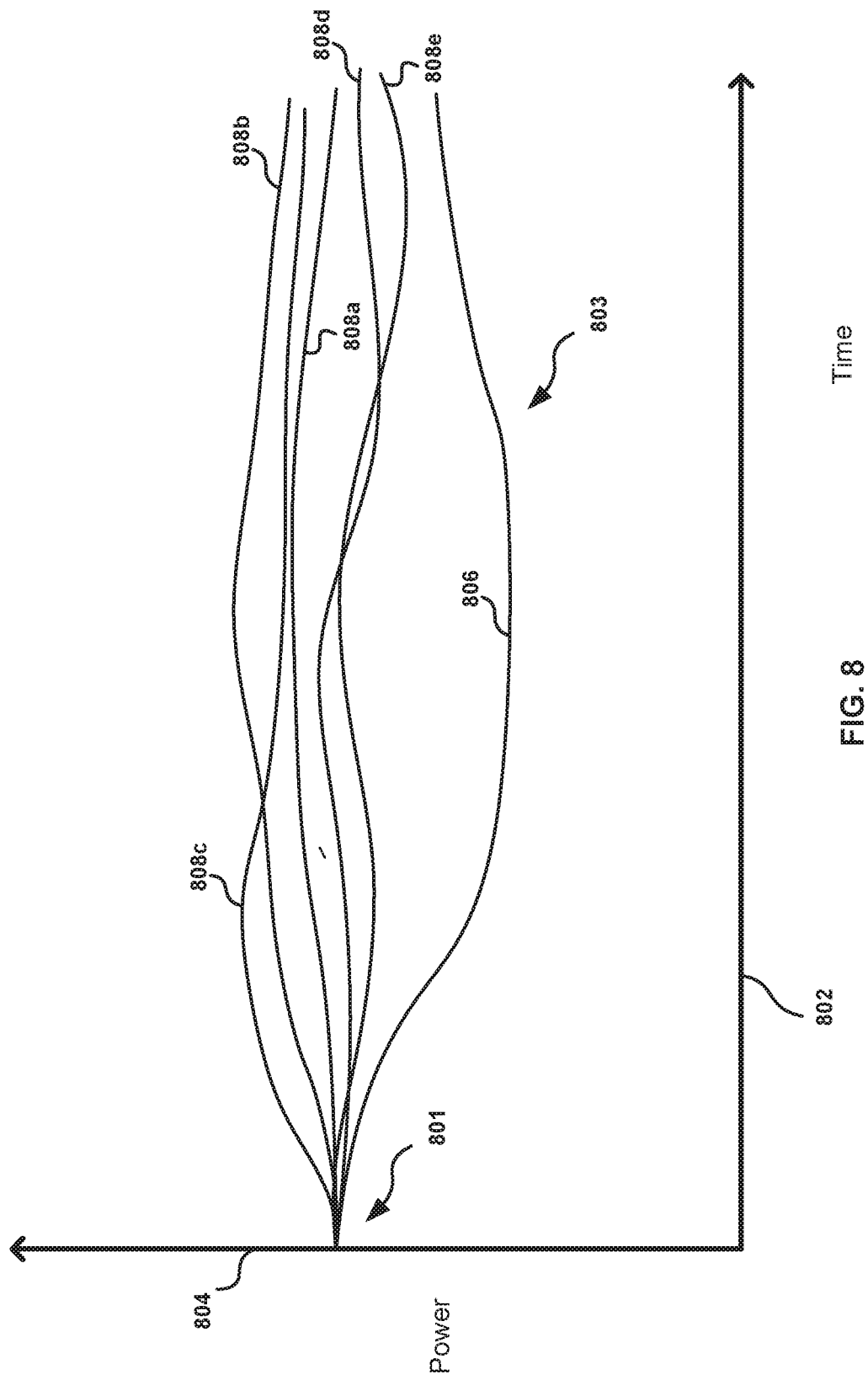
FIG. 8 show an additional embodiment of power distribution to each of the motors of a multirotor rotorcraft once a motor is detected to be malfunctioning, and then detected to no longer be malfunctioning.

FIG. 8 shows a chart also diagramming a distribution of power 804 supplied to motors 806, and 808a-e over time after a malfunction 801 is detected. In this embodiment, however, instead of shutting down the power entirely, power 804 is only reduced by around 40%. Likewise, power 804 to remaining motors 808a-e is adjusted, but only proportionally to the reduction in power to motor 806. According this embodiment, it may be determined by the flight computer that malfunctioning motor 806 is no longer malfunctioning, or malfunctioning to a lesser degree 803. Upon such a determination 803, power is slowly ramped back up to motor 806, while a proportional adjustment in power supplied to the remaining motors 808a-e is also shown in the chart.

Figure 9:
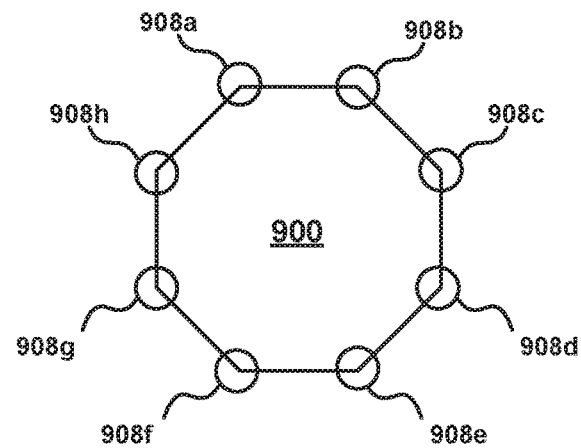
FIG. 9 shows an embodiment of power distribution to each of the eight motors of a multirotor rotorcraft once a motor is detected to be malfunctioning.
Figure 9:
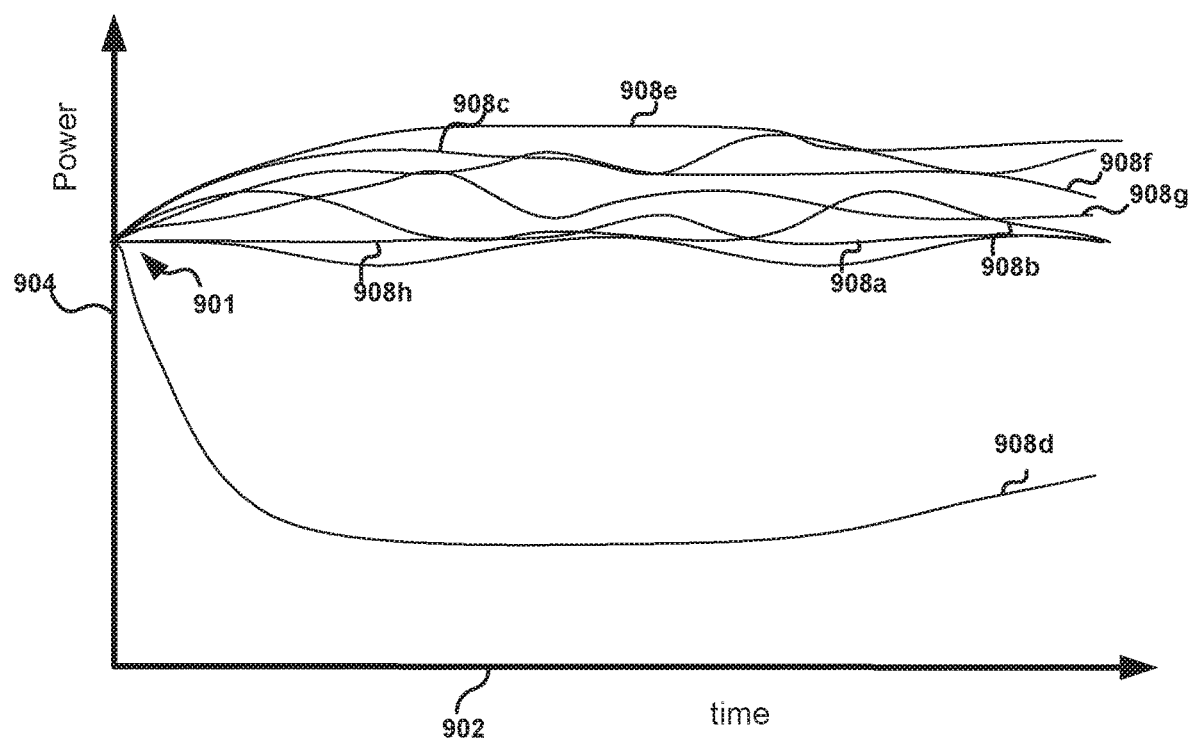

FIGS. 9a and 9b shows an embodiment of an eight-rotor rotorcraft 900 and a chart diagramming a distribution of power 904 supplied to motors 908a-908h after an event 901 is detected, respectively. According to this embodiment, the 8 motors of the rotorcraft are evenly spaced at the vertices of regular octagon. In the event that motor 908d experiences a malfunction and a power supplied to said motor is reduced, the power supplied to the remaining motors 908a-c and 908e-h may be dynamically adjusted over time, as shown according to this embodiment. For example, the flight computer (not shown) is configured to ramp up power to adjacent motors 908c and 908e whereas distal motors 908a experiences a decrease in power. According to this embodiment, the total thrust experiences by rotorcraft 900 stays substantially the same. Also shown in this embodiment is the controlled reduction of power to motor 908d as opposed to a sudden shutting down of the motor. In this embodiment, the remaining motors are able to compensate in synchronicity with the controlled reduction of power to motor 908d.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for adjusting power distribution to a plurality of motors of a rotorcraft, comprising:
receiving, at a flight computer, feedback from a plurality of sensors associated with the plurality of motors;
determining, at the flight computer, that a first motor in the plurality of motors is malfunctioning;
selecting, at the flight computer based on the feedback, one or more second motors in the plurality of motors for redistributing power;
reducing a power supplied to the first motor;
increasing a power supplied to the one or more second motors selected for redistributing power and dynamically adjusting a power distribution to the one or more second motors taking into account a net torque on the rotorcraft due to said reducing the power supplied to the first motor; and
performing diagnostics on the first motor while the first motor is being supplied with the reduced power for determining whether the first motor continues to malfunction or no longer malfunctions after said reducing the power supplied to the first motor.

2. The method of claim 1, further comprising:
analyzing a result of the diagnostics to determine whether the first motor continues to malfunction or no longer malfunctions;
upon determining that the first motor continues to malfunction, terminating power supplied to the first motor; and
upon determining that the first motor no longer malfunctions, increasing power supplied to the first motor.

3. The method of claim 1, wherein said reducing the power supplied to the first motor and said increasing the power supplied to the one or more second motors occur in synchrony.

4. The method of claim 1, wherein an increased thrust associated with the one or more second motors during said increasing the power supplied to the one or more second motors compensates for a decreased thrust associated with the first motor during said decreasing the power supplied to the first motor.

5. The method of claim 1, wherein the diagnostics include comparing sensor data associated with the first motor with expected values.

6. The method of claim 1, wherein the diagnostics include comparing sensor data associated with the first motor with sensor data associated with other motors in the plurality of motors.

7. The method of claim 1, wherein the diagnostics include accessing historical data of the first motor or environmental data of the rotorcraft.

8. A non-transitory machine-readable medium storing a program executable by at least one processing unit of a device, the program comprising sets of instructions for:
receiving, at a flight computer, feedback from a plurality of sensors associated with a plurality of motors;
determining, at the flight computer, that a first motor in the plurality of motors is malfunctioning;
selecting, at the flight computer based on the feedback, one or more second motors in the plurality of motors for redistributing power;
reducing a power supplied to the first motor;
increasing a power supplied to the one or more second motors selected for redistributing power and dynamically adjusting a power distribution to the one or more second motors taking into account a net torque on a rotorcraft due to said reducing the power supplied to the first motor; and
performing diagnostics on the first motor while the first motor is still being supplied with the reduced power for determining whether the first motor continues to malfunction or no longer malfunctions after said reducing the power supplied to the first motor.

9. The non-transitory machine-readable storage medium of claim 8, further comprising sets of instructions for:
analyzing a result of the diagnostics to determine whether the first motor continues to malfunction or no longer malfunctions;
upon determining that the first motor continues to malfunction, terminating power supplied to the first motor; and
upon determining that the first motor no longer malfunctions, increasing power supplied to the first motor.

10. The non-transitory machine-readable storage medium of claim 8, wherein said reducing the power supplied to the first motor and said increasing the power supplied to the one or more second motors occur in synchrony.

11. The non-transitory machine-readable storage medium of claim 8, wherein an increased thrust associated with the one or more second motors during said increasing the power supplied to the one or more second motors compensates for a decreased thrust associated with the first motor during said decreasing the power supplied to the first motor.

12. The non-transitory machine-readable storage medium of claim 8, wherein the diagnostics include comparing sensor data associated with the first motor with expected values.

13. The non-transitory machine-readable storage medium of claim 8, wherein the diagnostics include comparing sensor data associated with the first motor with sensor data associated with other motors in the plurality of motors.

14. The non-transitory machine-readable storage medium of claim 8, wherein the diagnostics include accessing historical data of the first motor or environmental data of the rotorcraft.

15. A rotorcraft system, comprising:
a plurality of motors for producing thrust;
a plurality of sensors for measuring one or more states of each of the plurality of motors;
a flight computer comprising one or more processors and a non-transitory machine-readable medium storing instruction that when executed by the one or more processors cause the one or more processors to:
receive, at the flight computer, feedback from the plurality of sensors associated with the plurality of motors;
determine, at the flight computer, that a first motor in the plurality of motors is malfunctioning;
select, at the flight computer based on the feedback, one or more second motors in the plurality of motors for redistributing power;
reduce a power supplied to the first motor;
increase a power supplied to the one or more second motors selected for redistributing power and dynamically adjusting a power distribution to the one or more second motors taking into account a net torque on the rotorcraft system due to said reducing the power supplied to the first motor; and
perform diagnostics on the first motor while the first motor is still being supplied with the reduced power for determining whether the first motor continues to malfunction or no longer malfunctions after said reducing the power supplied to the first motor.

16. The rotorcraft system of claim 15, wherein the instructions further cause the one or more processors to:
analyze a result of the diagnostics to determine whether the first motor continues to malfunction or no longer malfunctions;
upon determining that the first motor continues to malfunction, terminate power supplied to the first motor; and
upon determining that the first motor no longer malfunctions, increase power supplied to the first motor.

17. The rotorcraft system of claim 15, wherein said reducing the power supplied to the first motor and said increasing the power supplied to the one or more second motors occur in synchrony.

18. The rotorcraft system of claim 15, wherein an increased thrust associated with the one or more second motors during said increasing the power supplied to the one or more second motors compensates for a decreased thrust associated with the first motor during said decreasing the power supplied to the first motor.

19. The rotorcraft system of claim 15, wherein the diagnostics include comparing sensor data associated with the first motor with expected values.

20. The rotorcraft system of claim 15, wherein the diagnostics include comparing sensor data associated with the first motor with sensor data associated with other motors in the plurality of motors.

* * * * *